Patented Aug. 24, 1954

2,687,437

UNITED STATES PATENT OFFICE 2,687,437

ORGANIC PHOSPHINES, THEIR PHOSPHONIUM HALIDES AND METHODS FOR PREPARATION THEREOF

Alfred L. Oppegard, Wilmington Manor, Del., assignor to E. I. du Pont de Nemours and Company, Wilmington, Del., a corporation of Delaware No Drawing. Application April 20, 1951,
Serial No. 222,155

16 Claims. (Cl. 260—607)

This invention relates to organic phosphines, to their phosphonium salts, and to methods for their preparation.

Organic phosphines are a well known type of chemical compound and a variety of methods have been proposed for preparing them. However, the best of the hitherto known methods involve the use of relatively expensive intermediates and, hence, have not been desirable for commercial development.

It is an object of this invention to provide a novel process for the preparation of organic phosphines and their phosphonium salts. A further object is to provide a novel catalytic process for the preparation of organic phosphines and their phosphonium salts. A still further object is to provide novel organic phosphines, addition products and phosphonium salts thereof. Other objects will appear hereinafter.

The objects of this invention are accomplished by the following process which comprises heating a mixture of hydrocarbon having at least one olefinic double bond, white phosphorus and hydrogen at a temperature above 200° C. and under a pressure of 700 to 3000 atmospheres. It has now been found that organic phosphines can be prepared by the thermal addition of phosphorus and hydrogen to the double bond of an olefinic compound. The reaction can also be carried out in the presence of a catalyst, e. g., a halogen or a halogen compound. The use of such catalysts permits the reaction to be carried out at lower temperatures than when no catalyst is employed. Tricyclohexylphosphine, its phosphonium salts, and the carbon disulfide adduct of tricyclohexylphosphine are a novel class of compounds and they form a part of this invention.

A preferred method for carrying out the process of this invention involves heating a mixture of from 3 to 6 moles of a hydrocarbon having at least one olefinic double bond, e. g., ethylene, butadiene or cyclohexene, with 1 mole of white phosphorus under a hydrogen pressure of 800 to 1000 atmospheres at a temperature of 250° to 400° C. Optionally, the reaction can be carried out in the presence of a catalyst, e. g., a halogen such as iodine or a halogen compound such as methyl iodide or phosphorus tribromide. When a catalyst is used, the preferred reaction temperature is 250° to 350° C., while in the absence of a catalyst slightly higher temperatures, e. g., 300° to 400° C., are preferred. The reaction takes place in the absence of a solvent. However, in some cases when low boiling olefins are used it is convenient to use an inert organic solvent such as a hydrocarbon or ether. The reaction is continued until a substantial amount of the desired phosphine is obtained. Usually reaction times of from 10 to 20 hours are sufficient. Reaction times of less than 10 hours do not give complete reaction. The reaction can be considered complete when hydrogen is no longer absorbed by the reaction mixture, i. e., when there is no further drop in pressure in the system.

The organic phosphines obtained in this process can be isolated from the reaction mixture by conventional methods, e. g., by fractional distillation. They can also be isolated by reaction of the crude phosphines with carbon disulfide followed by recrystallization of the resulting tertiary phosphine-carbon disulfide complex. When the reaction is carried out in the presence of a catalyst such as methyl iodide or cyclohexyl iodide, some of the phosphonium salts are formed. For example, in the reaction of ethylene in the presence of methyl iodide as catalyst, tetraethylphosphonium iodide is formed, and in the reaction of cyclohexene with cyclohexyl iodide as catalyst, tricyclohexylphosphine hydroiodide is formed. These phosphonium salts are conveniently isolated by crystallization.

The ethylenically unsaturated compounds, the white phosphorus, and the hydrogen used in the process of this invention can be the ordinary grades of materials commercially available.

The invention is further illustrated by the following examples in which the proportions of ingredients are expressed in parts by weight, unless otherwise noted.

Example I

A pressure reactor having a Monel metal lining is charged with 10.3 parts (0.33 mole) of white phosphorus, 7.1 parts (0.05 mole) of methyl iodide and 50 parts of cyclohexane. The reactor is flushed with nitrogen and closed. The reactor is then cooled in a mixture of solid carbon dioxide and acetone, evacuated, and 29 parts (1.04 moles) of ethylene introduced. After coming to room temperature the reactor is pressured to 300 atmospheres with hydrogen and agitation and heating are started. The reaction is conducted at a temperature of 250° C. at 800 atmospheres pressure for 4 hours and at 250° C. and 950–980 atmospheres pressure for 11 hours. The pressure is maintained at these values by intermittent repressuring with hydrogen as needed. The total pressure drop during the reaction is 105 atmospheres. After the total reaction time of 15 hours the reactor is allowed to cool to room temperature and the internal pressure reduced to atmospheric by venting the gases to the atmosphere. The reaction product consists of 42 parts of a colorless liquid and 42 parts of a wet gray solid. Distillation of the liquid at atmospheric pressure under nitrogen yields 33 parts of cyclohexane and 4 parts of a liquid residue. This residue is diluted with diethyl ether and treated with carbon disulfide. There is obtained 2 parts of triethylphosphine-carbon disulfide addition compound, $(C_2H_5)_3P.CS_2$, melting at 108–110° C.

Analysis calculated for $C_7H_{15}PS_2$:
C, 43.30%; H, 7.74%;
P, 16.00%; S, 33.00%
Found:
C, 43.86%; H, 8.09%;
43.59%     8.09%
P, 16.43%; S, 32.99%
16.42%

The gray solid portion of the reaction product is washed with cyclohexane and extracted with hot ethanol. All of this solid but one part of a black residue dissolved in the alcohol. Upon cooling, the filtered alcoholic solution deposits white crystals of tetraethylphosphonium iodide, amounting to 15 parts. This material, on recrystallization from ethanol, has a melting point of 280–284° C.

Analysis calculated for $C_8H_{20}PI$:
C, 35.00%; H, 7.30%;
P, 11.30%; I, 46.40%
Found:
C, 34.32%; H, 7.49%;
34.31%     7.54%
P, 11.23%; I, 46.40%
11.68%     46.40%

Triethylphosphine can be obtained from tetraethyphosphonium iodide by thermal decomposition followed by distillation. Triethylphosphine boils at 128° C.

*Example II*

A pressure reactor of the type used in Example I is charged with 10.3 parts (0.33 mole) of white phosphorus, 28 parts (1 mole) of ethylene and 50 parts of cyclohexane and pressured with hydrogen as in Example I. The reactor is agitated and heated at 300° C. under 1000 atmospheres pressure for 15 hours. During this time the reactor is repressured with hydrogen as necessary to maintain the 1000 atmospheres pressure. The total pressure drop during the reaction amounts to 150 atmospheres. The reaction product is a liquid amounting to 60 parts. On distillation there is removed 37.5 parts of cyclohexane leaving a residue of 15.5 parts. This residue is fractionally distilled through a micro-Podbielniak still. The following fractions are obtained.

| Fraction | Boiling Point | Amount, ml. |
|---|---|---|
| 1 | 80° C | 2.0 |
| 2 | 80–116° C | 1.1 |
| 3 | 121–128° C | 1.1 |
| 4 | 128–132° C | 1.4 |
| 5 | 132–145° C | 1.0 |
| 6 | Residue | |

Fraction 1 is recovered cyclohexane. Fraction 4 contains triethylphosphine (B. P. 128° C.). This product forms an adduct with carbon disulfide, M. P. 117–119° C.; forms a sulfide, M. P. 96–98° C.; and forms a picrate, M. P. 111–113° C. Fraction 5 has the following elemental analysis:

C, 63.21%; H, 12.27%; P, 24.43%
62.86%    12.01%     24.57%

These analytical data indicate that higher phosphines are formed in addition to triethylphosphine. The residue is a high boiling liquid plus some solid.

*Example III*

A pressure reactor of the type used in the preceding examples is charged with 10.3 parts (0.33 mole) of white phosphorus and 54 parts (1 mole) of butadiene in 35 parts of diethyl ether. The reactor is pressured with hydrogen as in the preceding examples and the reaction mixture heated and agitated at 300° C. for 15 hours under 1000 atmospheres hydrogen pressure. The total pressure drop during the reaction is 110 atmospheres. The reaction product consists of 72 parts of a clear liquid and 4 parts of a pasty red solid. Ether is removed from the liquid product and the residue is distilled under reduced pressure. There are obtained a volatile fraction boiling at 78° C./165 mm. to 155° C./7 mm. amounting to 13 parts, and 20 parts of a clear, colorless, very viscous residue containing 10.23% phosphorus, 75.90% carbon and 11.17% hydrogen. The residue is soluble in ether and gives a red color with carbon disulfide, and apparently consists of low molecular weight polymers of butadiene containing phosphorus. The red color obtained with carbon disulfide indicates the presence of tertiary phosphines.

*Example IV*

A pressure reactor of the type used in the preceding examples is charged with 164 parts (2 moles) of cyclohexene, 21 parts (0.1 mole) of cyclohexyl iodide and 20.6 parts (0.66 mole) of white phosphorus. This mixture is heated at 250° C. for 15 hours under 1000 atmospheres hydrogen pressure. The system is represented with hydrogen intermittently to maintain the pressure at 1000 atmospheres. A total pressure drop of 450 atmospheres occurs during the reaction. The reaction mixture consists of 121.3 parts of a cloudy, reddish liquid and 63 parts of damp, red phosphorus. On distillation of the liquid fraction there are recovered 48 parts of cyclohexane, and traces of phosphine are detected in the residue of the distillation. The red solid portion of the reaction mixture is washed with benzene and then extracted with hot acetone followed by hot ethanol. From the acetone extract there is isolated 4 parts of white crystals of tetracyclohexylphosphonium iodide. After recrystallization from methanol and from ethyl acetate-ethanol the phosphonium iodide has a melting point higher than 310° C.

Analysis calculated for $C_{24}H_{44}PI$:
C, 58.80%; H, 9.00%;
P, 6.33%; I, 25.90%
Found:
C, 58.56%; H, 9.39%;
58.49%    9.53%
P, 6.36%; I, 25.67%;
6.24%    25.69%

Crystals of tricyclohexylphosphine hydroiodide, amounting to 5 parts, are obtained from the ethanol extract. After recrystallization these crystals melt at 180–183° C.

Analysis calculated for $C_{18}H_{34}PI$:
 C, 53.00%; H, 8.34%
 P, 7.60%; I, 31.55%
Found:
 C, 53.36%; H, 8.89%;
  53.20%  8.92%
 P, 7.75%; I, 30.92%
  7.77%   30.79%

Tricyclohexylphosphine is isolated by treating tricyclohexylphosphine hydroiodide with sodium hydroxide to liberate the free base. The trycyclohexylphosphine is identified by dissolving it in diethyl ether, and treating the dry ether solution with carbon disulfide. The resulting red addition product of carbon disulfide and tricyclohexylphosphine melts at 115–117° C. A sample of tricyclohexylphosphine-carbon disulfide adduct, obtained from tricyclohexylphosphine prepared by reaction of phenylmagnesium bromide with phosphorus trichloride, melts at 112–115° C., and a mixed melting point of the two samples is 115–117° C. The tricyclohexylphosphine melts at 74–76° C. It forms a sulfide, M. P. 172–175° C. and tricyclohexylmethylphosphonium iodide, M. P. 182–184° C.

*Example V*

A pressure reactor of the type used in the preceding examples is charged with 164 parts (2 moles) of cyclohexene, 14.2 parts (0.1 mole) of methyl iodide, and 20.6 parts (0.66 mole) of white phosphorus. This mixture is heated at 250° C. for 15 hours under 1000 atmospheres hydrogen pressure. Three such runs are made, each run being repressured with hydrogen intermittently to maintain the pressure at 1000 atmospheres. A total drop of 1285 atmospheres occurs in the three reactions. The products are combined and consist of 194 parts of dark red solid and 347.5 parts of liquid. The liquid is distilled to obtain 204.4 parts of cyclohexane and 90 parts of liquid residue. This residue is fractionally distilled through a Podbielniak still. The following compounds are obtained.

1. Cyclohexylphosphine, B. P. 97° C. 160 mm., 20 parts.

Analysis calculated for $C_6H_{13}P$:
 C, 62.00%; H, 11.20%
 P, 26.75%
Found:
 C, 62.17%; H, 11.34%
  62.02%  11.44%
 P, 26.47%
  26.40%

The structure is proved by oxidation of a concentrated hydrochloric acid solution of the product with nitric acid to obtain cyclohexanephosphonic acid, M. P. 163–166° C.

2. A secondary phosphine, $C_{13}H_{25}P$, B. P. 123° C./8 mm., 4.5 parts.

Analysis calculated for $C_{13}H_{25}P$:
 C, 73.6%; H, 11.8%; P, 14.63%
Found:
 C, 73.83%; H, 11.94%; P, 14.40%
  73.80%   11.90%  14.36%

This material is shown to be a secondary phosphine by treatment with methyl iodide to give a white crystalline product, M. P. 78–80° C. which when it is treated with base, releases an oil. A dry ether solution of the oil gives with carbon disulfide the deep red color characteristic of tertiary phosphines. The product thus appears to be a secondary phosphine.

After washing the original solid product (194 parts) with benzene the solid is extracted with hot acetone and hot alcohol. The insoluble part comprises 14.7 parts of red phosphorus. From the acetone extract is isolated 5 parts of a crystalline compound, $C_{16}H_{32}PI$, M. P. 168–170° C., which is believed to be a phosphonium iodide.

Analysis calculated for $C_{16}H_{32}PI$:
 C, 50.52%; H, 8.38%;
 P, 8.12%; I, 33.30%
Found:
 C, 51.28%; H, 8.71%;
  51.07%  8.55%
 P, 8.11%; I, 32.51%
  8.12%

From the alcohol extract a crystalline compound, $C_{12}H_{25}PI$, M. P. 200–203° C., of unknown structure is isolated.

Analysis calculated for $C_{12}H_{25}PI$:
 C, 44.2%; H, 7.35%;
 P, 9.50%; I, 39.00%
Found:
 C, 43.65%; H, 7.63%;
  43.92%  7.77%
 P, 9.72%; I, 37.21%
  9.70%

*Example VI*

A pressure reactor of the type used in the preceding examples is charged with 20.6 parts (0.66 mole) of white phosphorus, 14.2 parts (0.1 mole) of methyl iodide, 84 parts (2 moles) of propylene, and 50 parts of cyclohexane. This mixture is heated at 250° C. for 15 hours under 1,000 atmospheres hydrogen pressure. A total drop of 795 atmospheres pressure occurs during the reaction. The product consists of 43 parts of liquid and 52 parts of a brownish-black solid. The liquid portion is fractionally distilled and, in addition to 25 parts of recovered cyclohexane, the following products are isolated.

1. Monopropyl phosphine, boiling point 50°–52° C., 3 parts.

2. Tripropyl phosphine, boiling point 185°–186° C., 2 parts. The tripropyl phosphine reacts with methyl iodide to form crystals of methyltripropylphosphonium iodide having a melting point of 200°–202° C. It also reacts with carbon disulfide to give an addition product having a melting point of 96°–99° C. (with decomposition).

Analysis: Calculated for $(C_3H_7)_3P \cdot CS_2$:
 P, 13.13%  H, 8.9%
 C, 50.8%   S, 27.10%
Found:
 P, 13.16%  H, 9.71%
  13.93%   9.95%
 C, 51.42%  S, 26.19%
  51.85%

The solid reaction product is extracted with ethanol, leaving 14.5 parts of insoluble material. The ethanol solution is concentrated and ethyl acetate is added to it, whereupon 10 parts of white crystals of tripropylphosphonium hydroiodide melting at 205°–208° C. are obtained. These crystals are recrystallized from ethyl acetate and ethanol for analysis.

Analysis: Calculated for $(C_3H_7)_3P \cdot HI$:
 P, 10.75%  H, 7.64%
 C, 37.50%  I, 44.10%
Found:
 P, 10.90%  H, 8.05%
  10.94%   8.09%
 C, 37.81%  I, 43.84%
  37.67%   43.43%

In addition to the specific unsaturated hydrocarbons mentioned in the examples, the process of this invention can be carried out with any other hydrocarbon having at least one olefinic double bond. Specific examples of other olefins, or alkenes, which are operable include isobutylene and decene. Examples of other diolefins which can be used include isoprene, dimethyl butadiene and the like. Also, other cycloolefins which are operable include cyclopentene, 1-methyl-1-cyclohexene, and 2,4-dimethyl-1-cyclohexene. Unsaturated hydrocarbons of the above types having 2 to 10 carbon atoms and 1 to 2 ethylenic bonds are especially preferred.

A wide variety of halogens and halogen compounds can be used as catalysts for the preparation of phosphines by the process of this invention. The following compounds are especially valuable for this purpose: halogens such as, for example, iodine; alkyl halides, e. g., methyl iodide and ethyl bromide; cycloalkyl halides, e. g. cyclohexyl iodide; and inorganic halides, e. g., phosphorus tribromide. These halogen and halide catalysts are used in proportions ranging from 10 to 30 mole per cent of the phosphorus employed. Especially good results are obtained when the catalyst amounts to from 15 to 20 mole per cent based on phosphorus.

The solvent, which is optional in the process of this invention, can be a hydrocarbon or an ether. Examples of suitable solvents include hydrocarbons such as cyclohexane and toluene; and ethers such as diethyl ether, dibutyl ether and dioxane.

The products of this invention are particularly useful as chemical intermediates for the formation of a wide variety of other organo phosphorus compounds such as phosphinic and phosphonic acids, etc. The organic phosphines and phosphonium halides are also useful as insecticides, fungicides, antioxidants and lubricating oil additives.

The process of this invention is especially useful since it provides a method for the preparation of organic phosphines and phosphonium halides from relatively low cost starting materials.

As many apparently widely different embodiments of this invention may be made without departing from the spirit and scope thereof, it is to be understood that this invention is not limited to the specific embodiments thereof except as defined in the appended claims.

I claim:

1. A process which comprises heating a mixture of a hydrocarbon having one to two ethylenic double bonds, white phosphorus and hydrogen at a temperature of 250° to 400° C., and under a pressure of 700 to 3000 atmospheres.

2. A process which comprises heating a mixture of a hydrocarbon having one to two ethylenic double bonds, white phosphorus and hydrogen at a temperature of 250° C. to 400° C., and under a pressure of 700 to 3000 atmospheres in the presence of a member of the class consisting of iodine, methyl iodide, ethyl bromide, cyclohexyl iodide and phosphorus tribromide.

3. A process which comprises heating in an inert solvent a mixture of a hydrocarbon having one to two ethylenic double bonds, white phosphorus and hydrogen at a temperature of 300° C. to 400° C., and under a pressure of 700 to 3000 atmospheres.

4. A process which comprises heating a mixture of ethylene, white phosphorus and hydrogen at a temperature of 250° C. to 400° C., and under a pressure of 700 to 3000 atmospheres.

5. A process which comprises heating a mixture of butadiene, white phosphorus and hydrogen at a temperature of 250° C. to 400° C., and under a pressure of 700 to 3000 atmospheres.

6. A process which comprises heating a mixture of cyclohexene, white phosphorus and hydrogen at a temperature of 250° C. to 400° C., and under a pressure of 700 to 3000 atmospheres.

7. A process which comprises heating a mixture of propylene, white phosphorus and hydrogen at a temperature of 250° C. to 400° C., and under a pressure of 700 to 3000 atmospheres.

8. The chemical compound, tricyclohexylphosphine.

9. A process which comprises heating a mixture of a hydrocarbon having one ethylenic double bond, white phosphorus and hydrogen at a temperature of 300° C. to 400° C. and under a pressure of 700 to 3000 atmospheres.

10. A process which comprises heating a mixture of a hydrocarbon having two ethylenic double bonds, white phosphorus and hydrogen at a temperature of 300° C. to 400° C., and under a pressure of 700 to 3000 atmospheres.

11. Tetracyclohexylphosphonium iodide.

12. Tricyclohexylphosphine hydroiodide.

13. Tricyclohexylmethylphosphonium iodide.

14. A process which comprises heating a mixture of a hydrocarbon having one to two ethylenic double bonds, white phosphorus and hydrogen at a temperature of 250° C. to 400° C., and under a pressure of 700 to 3000 atmospheres in the presence of methyl iodide.

15. A process which comprises heating a mixture of cyclohexene, white phosphorus, and hydrogen at a temperature of 250° C. to 400° C., and under a pressure of 700 to 3000 atmospheres in the presence of cyclohexyl iodide.

16. A compound selected from the class consisting of tricyclohexylphosphine, tetracyclohexylphosphonium iodide, tricyclohexylphosphine hydroiodide and tricyclohexylmethylphosphonium iodide.

References Cited in the file of this patent

UNITED STATES PATENTS

| Number | Name | Date |
|---|---|---|
| 2,160,840 | Dreyfus | June 6, 1939 |
| 2,584,112 | Brown | Feb. 5, 1952 |

OTHER REFERENCES

Deutsche Chemische Gesellschaft-Berichte, 6, 1873, pp. 296 and 297.

Mellor, "Comprehensive Treatise on Inorganic and Theoretical Chemistry," vol. 8, p. 806.